United States Patent
Venkataraman et al.

(10) Patent No.: US 9,788,223 B2
(45) Date of Patent: Oct. 10, 2017

(54) PROCESSING CUSTOMER EXPERIENCE EVENTS FROM A PLURALITY OF SOURCE SYSTEMS

(71) Applicant: NOKIA SOLUTIONS AND NETWORKS OY, Espoo (FI)

(72) Inventors: Dakshinamoorthy Venkataraman, Bangalore (IN); Achill Andreas Schirilla, Munich (DE); Lassaad Essafi, Dubai (AE); Somasundaram Velayutham, Sunnyvale, CA (US); Yogesh Sachwani, Bangalore (IN); Prafull Kumar, Bangalore (IN); Vijay Ranganathan, Bangalore (IN); Sachin Sachdeva, Delhi (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/889,171

(22) PCT Filed: May 6, 2014

(86) PCT No.: PCT/EP2014/059148
§ 371 (c)(1),
(2) Date: Nov. 5, 2015

(87) PCT Pub. No.: WO2014/180801
PCT Pub. Date: Nov. 13, 2014

(65) Prior Publication Data
US 2016/0088501 A1    Mar. 24, 2016

(30) Foreign Application Priority Data

May 6, 2013 (FI) .................................. 20135468

(51) Int. Cl.
*H04W 24/00* (2009.01)
*H04W 24/08* (2009.01)
(Continued)

(52) U.S. Cl.
CPC ........... *H04W 24/08* (2013.01); *H04L 41/022* (2013.01); *H04L 41/069* (2013.01);
(Continued)

(58) Field of Classification Search
CPC . H04L 41/5074; H04L 45/28; H04L 63/0884;
H04L 43/0817; H04L 41/5067;
(Continued)

(56) References Cited

U.S. PATENT DOCUMENTS

2006/0156086 A1   7/2006 Flynn et al.
2008/0056144 A1   3/2008 Hutchinson et al.
(Continued)

FOREIGN PATENT DOCUMENTS

WO      00/74430 A2    12/2000
WO    2008/022291 A2    2/2008
(Continued)

OTHER PUBLICATIONS

International Search Report and Written Opinion dated Jul. 21, 2014, issued in corresponding International Application No. PCT/EP2014/059148.
(Continued)

*Primary Examiner* — Kwasi Karikari
(74) *Attorney, Agent, or Firm* — Squire Patton Boggs (US) LLP (57) ABSTRACT

There is provided improved management of a communications network including a plurality of sub-systems for providing services to subscribers. Data is received from a plurality of source systems in a communications network, said source systems encoding data according to different
(Continued)

data models. Rules of processing the data received data from each of the source systems are defined. At least one customer experience event of the communications network is generated on the basis of the rules.

17 Claims, 3 Drawing Sheets (51) Int. Cl.
*H04L 12/24* (2006.01)
*H04W 24/04* (2009.01)
*H04W 28/02* (2009.01)
*H04L 12/26* (2006.01)
*H04L 12/14* (2006.01)

(52) U.S. Cl.
CPC ...... *H04L 41/0654* (2013.01); *H04L 41/0672* (2013.01); *H04L 41/0677* (2013.01); *H04L 41/5009* (2013.01); *H04L 41/5025* (2013.01); *H04L 41/5067* (2013.01); *H04L 43/16* (2013.01); *H04W 24/04* (2013.01); *H04W 28/0236* (2013.01); *H04W 28/0252* (2013.01); *H04W 28/0268* (2013.01); *H04L 12/1485* (2013.01); *H04L 41/5006* (2013.01); *H04L 43/0858* (2013.01); *H04L 43/0888* (2013.01)

(58) Field of Classification Search
CPC . H04L 43/0847; H04L 43/50; H04L 41/0654; H04L 41/5032; H04L 41/507; H04L 43/0811; H04L 65/80; H04L 12/2697; H04L 41/0631

USPC ....................................................... 455/424
See application file for complete search history.

(56) References Cited

U.S. PATENT DOCUMENTS

| 2009/0075655 | A1* | 3/2009 | Dobson ............... H04L 41/5009 455/436 |
| 2009/0225670 | A1 | 9/2009 | Leung et al. |
| 2011/0082926 | A1* | 4/2011 | Triano .................. G06F 11/076 709/224 |

FOREIGN PATENT DOCUMENTS

| WO | 2011/045736 A1 | 4/2011 |
| WO | 2012/084009 A1 | 6/2012 |

OTHER PUBLICATIONS

Office Action dated Feb. 6, 2014, issued in corresponding Finland Application No. 20135468.

Miyazawa et al. "Hierarchical resource model-driven performance analysis with dynamic data control"; IEEE Network Operations and Management Symposium (NOMS 2012): Maui, Hawaii (Apr. 16-20 2012).

G.107; Series G: Transmission Systems and Media, Digital Systems and Networks; International telephone connections and circuits—General definitions; "The E-model, a computational model for use in transmission planning"; Mar. 2005.

* cited by examiner

```
<CEDREvent>
  <CEDRHeader>
    <EventID>10000</EventID>
    <SourceApplication>SAI-TNP</SourceApplication>
    <EventClass>Thresholdviolation</EventClass>
    <Severity>CRITICAL</Severity>
    <EventStatus>Open</EventStatus>
    <HostName>Sai-Tnp-Node1</HostName>
    <Priority>2</Priority>
    <Time>2012-07-10T14:01:25-05:00</Time>
     <EventType>Single</Time>
  </CEDRHeader>
  <CEDRBody>
    <Entity>
      <EntityName>PerformanceConseqValues</EntityName>
      <EntityAttribute>thresholdValue</EntityAttribute>
      <EntityAttributeType>Long</EntityName>/EntityAttributeType>
      <EntityAttributeValue>191</EntityAttributeValue>
      <EntityAttribute>observedValue</EntityAttribute>
      <EntityAttributeType>String</EntityAttributeType>
      <EntityAttributeValue>CallDrop</AttributeValue>
      <EntityAttribute>piStartTime</EntityAttribute>
      <EntityAttributeType>Date</AttributeType>
      <EntityAttributeValue>2012-06-10T14:00:00-05:00</AttributeValue>
    </Entity>
  <CEDRBody>
<CEDREvent>
```

410 — Header

406 — Body

PROCESSING CUSTOMER EXPERIENCE EVENTS FROM A PLURALITY OF SOURCE SYSTEMS

FIELD

The present invention relates to reception of data from a plurality of source systems in a communications network, and more particularly to processing the data received from the source systems.

BACKGROUND OF THE INVENTION

Present telecommunication networks offer a wide range of services to their subscribers. The servicers are defined in subscriber profiles and they typically include services such as voice calls, Short Message Service (SMS) messages and data transfer. A service may be provided in the telecommunication network at different levels. For example, the data transfer service may be provided at different levels defined by speeds of 512 kbit/s, 1 Mbit/s, 2 Mbit/s, 7 Mbit/s, 21 Mbit/s and 42 Mbit/s offered to the subscriber. From the subscriber's perspective, it is important that the subscribed service is received according to his or her subscription. Accordingly, a subscription defining the data transfer rate at 21 Mbits/s is expected to offer the data transfer at the defined speed. If the subscriber is satisfied or dissatisfied to the received service, the subscriber can provide feedback to the operator the subscriber is subscribed to. Typically the feedback can be given by calling to the customer service of the operator or by contacting the operator via the internet. However, such a way of collecting feedback on the quality of the provided services in the telecommunication network requires time and effort from the subscribers. Moreover, usually the subscribers contact the operator in cases of faults in their service. In such cases the service quality of the service is already severely degraded and the feedback may assist the operator to only correct a specific issue in the network that affects the service quality of the single subscriber. Therefore, the feedback received from the subscribers is difficult use for improving the overall customer experience offered to the subscribers.

A typical telecommunications network is a combination of various subsystems, e.g. a radio access network, a core network, billing systems and a Customer Relationship Management (CRM) system. Each of the sub-systems may be implemented by products, e.g. hardware or software, from more than one supplier. The products typically generate data, e.g. fault information and counter data, during the operation of the product. Conventionally such data is available as stored by the product into log files into a proprietary format. The product itself may include a reporting tool that provides visualization of the data into a graphical presentation. Since the graphical representations or data formats of different suppliers are typically not compatible with each other, it is difficult to establish an understanding of the customer experience offered to the subscribers from the available data.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

Various embodiments comprise a method, apparatuses and a computer program product as defined in the independent claims. Further embodiments are disclosed in the dependent claims.

According to an aspect there is provided a method comprising receiving data from a plurality of source systems in a communications network, said source systems encoding data according to different data models, defining rules of processing the data received from each of the source systems, generating, on the basis of the rules, at least one customer experience event of the communications network.

According to an aspect there is provided an apparatus comprising a receiver arranged receive data from a plurality of source systems in a communications network, said source systems encoding data according to different data models; a storage medium storing rules of processing received data from each of the source systems, and a controller arranged generate, on the basis of the rules, at least one customer experience event of the communications network.

According to an aspect there is provided an apparatus configured to perform the steps of a method according to an aspect.

According to an aspect there is provided an apparatus comprising means configured to perform a method according to an aspect.

A computer program product comprising executable code that when executed, cause execution of steps of a method according to an aspect.

According to another aspect of the invention there is provided an arrangement comprising at least one processor, and at least one memory including computer program code, the at least one memory and the computer program code configured to, with the at least one processor, cause the apparatus at least to perform a method according to an aspect.

According to another aspect there is provided a computer program embodied on a non-transitory computer readable storage medium, the computer program being configured to control a processor to perform a method according to an aspect.

Although the various aspects, embodiments and features of the invention are recited independently, it should be appreciated that all combinations of the various aspects, embodiments and features of the invention are possible and within the scope of the present invention as claimed.

Some embodiments may provide improvements comprising improved management of a communications network including a plurality of sub-systems for providing services to subscribers. Further improvements will become apparent from the following description.

BRIEF DESCRIPTION OF THE DRAWINGS

In the following embodiments will be explained with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, a data model is used to refer to a description of objects generated by a computer system together with their properties and relationships. The data model defines rules of storing and organizing data. In the following embodiments the generated objects include data representing customer experience events of a communications network.

Figure 1A:
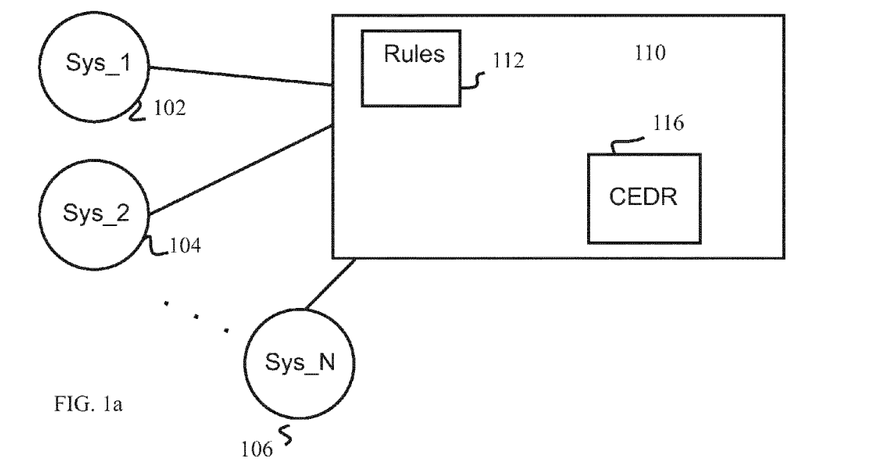
FIGS. 1a and 1b illustrate architectures of systems for customer experience event generation, according to embodiments.
Figure 1B:
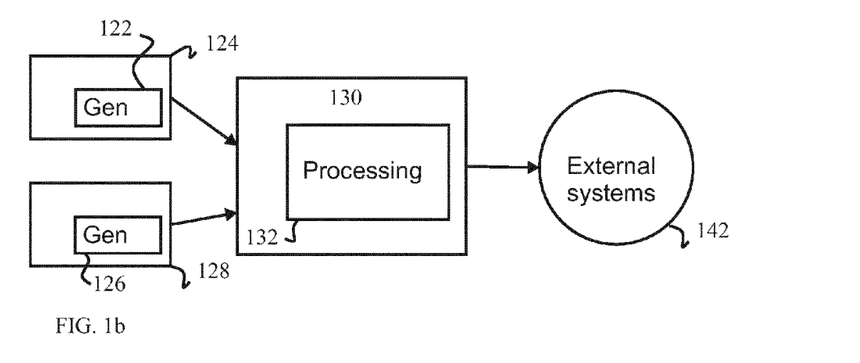

FIGS. 1a and 1b illustrate architectures of systems for customer experience event generation in a communications network, according to embodiments. In FIG. 1a centralized implementation of customer experience event generation is described, where a plurality of source systems 102, 104, 106 supply data to a centralized customer experience even generator 110. In FIG. 1b, each of the source systems 124, 128 include a customer experience even generator 122, 126 that supply customer experience events to a receiving system 130.

Referring to FIG. 1a, the system comprises a customer experience event generator 110 and source systems 102, 104, 106 that are connected to the customer experience event generator by wired or wireless connections. The customer experience event generator includes rules 112 of processing data received data from the source systems and customer experience events 116 obtained by the processing. Accordingly, the customer experience event generator may be implement a data model defined by the rules and store the objects generated by the data model as customer experience events.

The communications network may comprise a telecommunications network providing telecommunication services to subscribed users. A typical telecommunications network includes a mobile communications network. Examples of the mobile communications network include networks according to the specifications defined by the 3GPP such as Global System for Mobile communications (GSM), Universal Mobile Telecommunications System (UMTS) or Long Term Evolution networks.

Examples of the source systems comprise a device management server, a billing system, a network management system of a telecommunications network, a network element of a radio access network, a network element of a core network, a customer relationship management system. The source systems are sub-systems of the communications network and are used to provide subscribers of the communications network their subscribed services. Subscribed services of each subscriber may be defined in a subscriber profile stored in a subscriber database, as is conventional.

The connections between the customer experience event generator and source systems may be implemented by one or more standardized protocols including X.25, Ethernet, Internet Protocol versions 4 and 6 defined the Internet Engineering Task Force (IETF), for example.

A source system may connect to the customer experience generator by a direct connection or via one or more networks. In various exemplary embodiments, a network may comprise one or more packet-switched based networks and/or circuit-switched based networks. As such, a network may include, for example, one or more IP networks, Ethernet networks, metro Ethernet networks, gigabit Ethernet networks, frame relay networks, asynchronous transfer mode (ATM) networks, synchronous optical networking (SONET) networks operating as a standalone network or in cooperation with each other.

The source systems and the customer experience generator may include Operating Systems (OSs) for example, Linux, Windows or Unix, that provide in combination with the hardware a platform for execution of applications. Some of the source systems may be implemented by a general purpose computer that is installed with an OS.

The source systems may comprise networks including one or more elements that may be connected to the customer experience event generator. In one example of the source systems, a source system comprises a radio access network of a mobile communications network. Typically the radio access network includes base stations, e.g. NodeBs or evolved NodeBs, that provide transmission and reception of radio frequency signals in their respective service areas so that User Equipment (UE) holding a subscription of the operator of the network can be provided their subscribed services, e.g. calls, SMSs and data transfer. The base stations may be connected to the customer experience event generator directly or via a Network Management System (NMS) that is used to manage the network elements of the communications network. Further examples of network elements of a communications network include a switching center of a core network and a Radio Network Controller (RNC) that may be connected to the customer experience event generator Description of typical elements of a communications network and operations performed in a communications network, especially a mobile communications network, may be referred for example in the $3^{rd}$ Generation Partnership Project (3GPP) Release 99, and later specifications.

Referring to FIG. 1b, the customer experience event generators 122 and 126 may be implemented as described in FIG. 1a. The receiving system 130 may be a computer system executing an application that processes the customer experience events received from the source systems. The receiving system may include a processing unit 132, where the processing of the customer experience events may be implemented. Processing of the customer experience events may comprise analyzing the received events and controlling of external systems 142 that are connected to the receiving system. These external systems may comprise a server, for example a device management server or one or more of the source systems, e.g. a device management server, a billing system, a network management system of a telecommunications network, a network element of a radio access network, a network element of a core network, a customer relationship management system. The connections between the elements illustrated in FIG. 1b may be implemented similar manner to the connections in FIG. 1a.

In one example of operation performed by the receiving system, the receiving system processes 132 the received customer experience event information form the source systems and determines a number of call drops in a communications network. The call drops may be determined over a specific time interval, for example hour, day, month or year. The number of call drops may be specified for a network element including but not limited to a cell of a base station, a base station, a cluster of cells or a controller, e.g. a radio network controller, RNC of UMTS network. A network element may be identified by an identifier, for example a cell identifier. The call drops may be analyzed against a threshold value for the call drops. The threshold value may define a limit indicating a degraded service being offered to the customers, i.e. subscribers. The threshold value may be defined in percentages, e.g. a call drop value of 5%. When the receiving system determines that the call drops are more than 5% of the total number of calls, the receiving system may determine a procedure to restore the service level. The procedure may be for example to reboot the network element that originates the call drops or reboot the RNC controlling the cell that reported the call drops. The rebooting may be provided by command on a connection to the network element in question or by a connection to the network management system connected to the network element, whereby the rebooting command is sent to the network element via the NMS. The rebooting may comprise restarting an operating system of the network element and/or restarting both hardware and software of the network element via shutting of the power and switching the power back on. It should be appreciated that also other thresholds may be set for the call drops and there may be several thresholds. Also other customer experience events in addition to or instead of the call drops may be determined in the receiving system.

In another example of operation performed by the receiving system, the receiving system processes the received customer experience event information form the source systems and determines network utilization for a subscriber of a communications network. The subscriber may be identified by a subscriber identifier or an identifier of a connection associated with a subscriber. Subscriber information is available from subscriber databases, for example. The network utilization may be determined over a specific time interval, for example hour, day, month or year. The network utilization may be analyzed against a threshold value for the network utilization. The threshold value may define a limit indicating a level of network utilization of the subscriber. The threshold value may be defined by an amount of data, e.g. in bytes. In one example the threshold for the amount of data may be 10 Giga Bytes. When the receiving system determines that the network utilization of a subscriber is more than the amount of data defined by the threshold, the receiving system may determine a procedure to be applied to the subscriber. The procedure may be for example to change one or more parameters of the service of the subscriber. The parameters of the service may comprise a tariff to be applied for the data transfer and or the data transfer rate. Accordingly, when the network utilization of the subscriber has exceeded the threshold, the charging and/or the data transfer rate applied to the connections of the subscriber may be changed. The charging may be changed by a message to the CRM system to apply a new tariff or to indicate that a higher or lower tariff should be used. The data transfer rate of the subscriber may be changed by a message to the network element serving the subscriber to indicate that a higher or lower data rate should be used for the subscriber. The network element serving the subscriber may be a base station, RNC, a gateway, and/or a database storing a service definition, including the data rate, of the subscriber. It should be appreciated that also other thresholds may be set for the network utilization and there may be several thresholds. Also other customer experience events in addition to or instead of the network utilization may be determined in the receiving system. In yet another example of operation performed by the receiving system, the receiving system processes the received customer experience event information from the source systems and determines incorrect device settings of the UE. The UE may then be sent correct device settings by a command to device management server to send out the management command including new device settings to the UE. The command to the device management server may include an identifier of the subscriber to allow the device management server to determine the correct settings to be sent to the UE.

Figure 2:
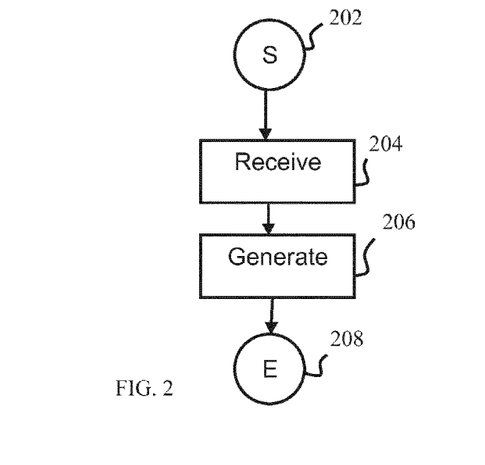
FIG. 2 illustrates a process of generating a customer experience event.

FIG. 2 illustrates a process of generating a customer experience event. The process may be executed by the customer experience event generator of FIG. 1a or 1b, for example. The process starts in 202, where the source systems are connected to the customer experience event generator and are operational. When operational, the source systems generate data that is transmitted to the customer experience event generator. The data may comprise performance information and/or fault data of the source system. The data from the source systems may comprise data in a specific format used by the source system. Examples of the formats include eXtensible Event Stream (XES), Common Event Expression (CEE), Common Event Format (CEF), for example.

In 204 data is received from a plurality of source systems in a communications network. The source systems encode data according to different data models. The data models may be proprietary and dependent on the supplier of the source system. Since the data models are different, the objects of data generated by the different data models are incompatible. Accordingly, the generated data objects may be of different formats, e.g. the XES, CEE or CEF.

The customer experience event generator includes a definition of rules of processing the data received data from each of the source systems in the communications network. The rules may define the data model according to which the data of events is stored. The rules may be predefined in the customer event generator based on the data models of the source systems. The rules define a relationship between the received data and a customer experience event. The relationship may be define which part of the received data is used to generate the customer experience event and a process of obtaining the customer experience event from the received data.

The customer experience events include events determined on the basis of the rules from the received data. Examples of the events include but are not limited to call drops, detecting a sleeping cell of a base station, changes of quality of service experience by subscribers. A call drop may be determined by the received data indicating a failure of the connection used for the call, for example a Radio Access Bearer. A sleeping cell may be detected by the received data indicating an unusually high number of connection attempts, for example Radio Resource Control connection requests in a cell. The high number of attempts may be determined by comparing the number of attempts to an assumed amount of traffic served by the cell and/or to a statistical value obtained from historical data for the cell. The changes of the quality of service may be determined by measured data rates and/or delay information received for a connection of a single subscriber or all the subscribers served by the communications network.

In one example, the processing defined by the rules comprises aggregating the received data to the customer experience event. The aggregating may comprise combining data from different source systems to form a single customer experience event.

In an example, the received data comprises delay information of delays experienced by packets in a communications network. The delay information may be received from a plurality of network elements that serve the packets. The network elements providing the delay information may comprise one or more of routers, base stations and gateways, for example. The received delay information may comprise a measurement of delay, e.g. in ms, experienced by a data packet between receiving the data packet before the received data packet it is forwarded by the network element. The measurement of delay may be an average value of delay experienced by packets served a specific network element or the measurement of delay may be a measurement of delay exceeding a threshold for the delay.

In 206, at least one customer experience event is generated on the basis of the rules. Using the above example of the received data comprising delay information, a customer experience event may be generated on the basis of the received delay information according to the rules defined for processing of the delay information. The processing may include aggregating the delay information into a combined delay value that represents an overall delay experienced by the data packets. In this way, the obtained customer experience event represents the overall customer experience for the data transmission.

It should be appreciated that a delay involved in transmission of packets affects the customer experience in various ways depending on the application the packets are related to. For example in transmission of files, a delay introduced to the transmission decreases the data rate, whereby expectations of the customer may not be met, when the delays are high. In another example, a delay introduced to a Voice over Internet Protocol (VoIP) call is an issue to the perceived call quality of the participant in the call. Delay requirements for voice calls have to meet strict requirements to enable a normal conversation between the participants, without a need for the participants to consider the delay of the data transmission.

In an embodiment, the customer experience event includes a Mean Opinion Score (MOS) calculated on the basis of the received data. The MOS may be calculated on the basis of the delay information received from the transmission of packet data in a data transmission as explained above. A computational model may be used to obtain the MOS, for example the International Telecommunication Union Telecommunication Standardization Sector (ITU-T) E-model defined in ITU-T recommendation G.107 (March 2005).

In 208, the received data is processed to a customer experience event and the process ends. The generated customer experience event may be used for improving the service provided by the communications network by providing an overview of the customer experience provided by the source systems. This improved understanding of the customer experience may be used for design of improvements to the communications network and evaluation of the implemented improvements.

In one example the customer experience event may be further processed in a computer system receiving the customer experience events or the customer experience event generator may include the functionality to further process the customer experience events. The processing may comprise determining a customer experience event exceeding a threshold indicating a degraded service for a subscriber, determining a network element originating the customer experience event, and controlling, for example rebooting, the network element or a controller of the network element. The rebooting is described in more detail above. The controlling of the determined network element may provide that the customer experience events originated from the network element may be decreased below the threshold, which may be considered as correct operation of the network element.

In another example the processing may comprise determining a customer experience event exceeding a threshold indicating a network utilization of a service for a subscriber, determining a network element originating the customer experience event, and changing one or more parameters of the service. In yet another example the processing may comprise determining a customer experience event indicating an incorrect device setting of user equipment, and sending a command to a device management server to supply the user equipment with new device settings. The new device settings and/or new parameters may provide that the customer experience events originated from the network element may be decreased below the threshold, which may be considered as correct operation of the network element.

The above examples of the processing of customer experience events may be performed employing the architectures illustrated in FIGS. 1 and 1b, where the operations performed based on the customer experience events have been described in more detail.

Figure 3:
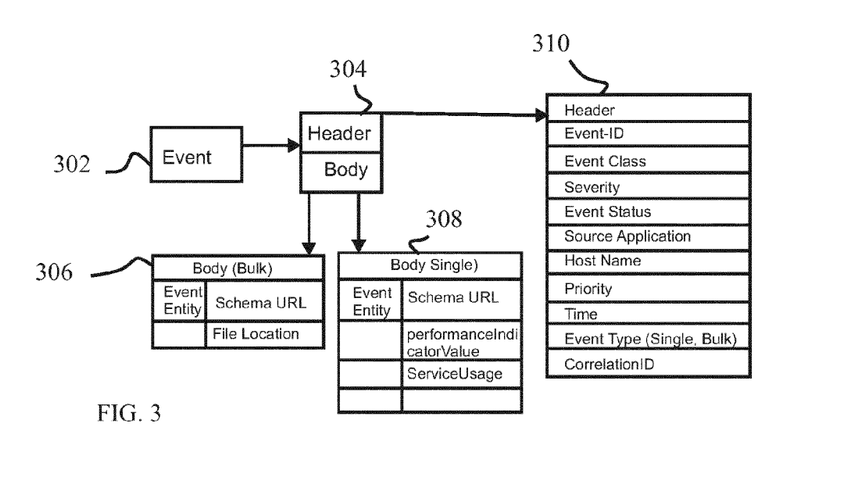
FIG. 3 a structure of a data record for storing a customer experience event.

FIG. 3 illustrates a structure of a data record 304 for storing a customer experience event, according to an embodiment. The customer experience event data record is a format of storing customer experience event 302. The customer experience event may be generated as described in the process of FIG. 3 and stored to the data record 304. The customer experience event data record comprises a header 310 identifying the customer experience event and a body including one or more attributes of the event.

The header may further include information including one or more of a priority of the event, classification of the event, severity of the event, status of the event, application causing the event, hostname originating the event, time of the event, event type, and a correlation identifier of the event. The further information may be generated on the basis of processing the received data according to the rules in the process of FIG. 3.

The body may include one or more instances 308 of attributes, or the attributes may be provided in a bulk format 306, e.g. as a file location storing the attributes.

In an embodiment, attributes of the customer experience event are entities of defined set of attributes. In an example the, the attributes may follows a Shared Information/Data Model (SID), an example of which is the Tele Management Forum's Frameworx. Accordingly, the attributes may comprise SID entities defined by a schema. The schema may be provided in the body as an address, e.g. a Uniform Resource Locator (URL), to the location of the schema.

Figure 4:
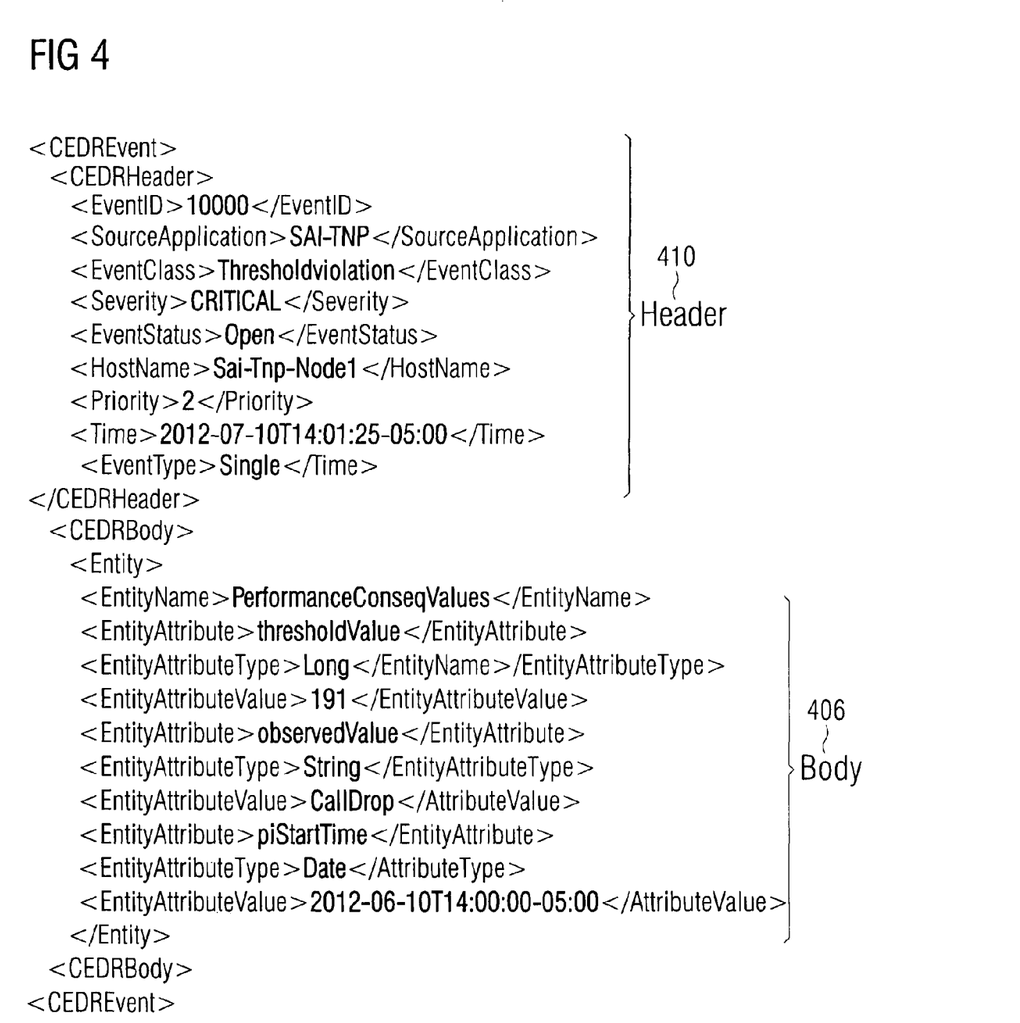
FIG. 4 illustrates an example of a customer experience event data record.

An example of a customer experience event data record is illustrated in FIG. 4. The customer experience data record follows the structure illustrated in FIG. 3. In the illustration the customer experience event is illustrated as an extended mark-up language, XML, file. The customer experience event data record comprises a header 410 and a body 406. The header includes an identifier of the event <EventID>, classification of the event <EventClass>, severity of the event <Severity>, status of the event <Open>, application causing the event <SourceApplication>, hostname originating the event <HostName>, time of the event <Time>, event type <EventType>.

The body includes instances of attributes from a defined set of customer experience event attributes. The attributes included in the body are "thresholdValue", "observedValue" and "piStartTime". A value and a definition of the format of the value are stored with each of the attributes. The attributes and the information stored with each of the attributes may follow a schema defined for the attributes. Thus the attributes may be SID entities.

Figure 5:
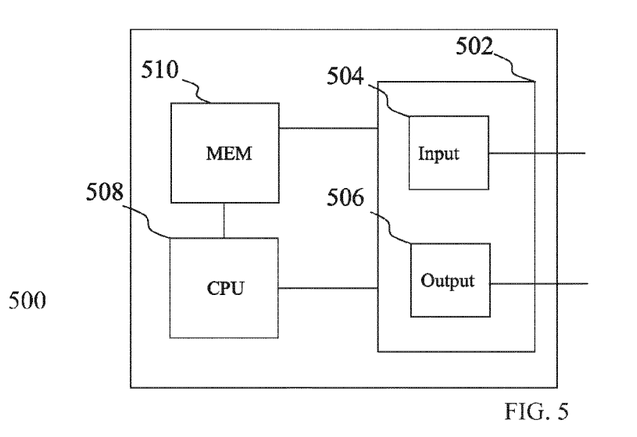
FIG. 5 illustrates an apparatus according to an embodiment.

It should be appreciated that the above structure of the data record for storing a customer experience event is only exemplary and some of the fields may be omitted or they may be named differently in practical implementations. Furthermore, different customer experience event generators may generate data records having different structures. FIG. 5 illustrates an apparatus 500 according to an embodiment. The apparatus may be a customer experience event generator or the receiving system in FIGS. 1a and 1b for example. The apparatus includes a processor 508, a memory 510 and an interfacing unit 502 for communicating data and messages, all units being electrically interconnected. The interfacing unit may include an input unit 504 for receiving data and messages, and an output unit 506 for transmitting data and messages. The memory may store data and messages received from the input unit.

The memory may include instructions for example program code that the processor executes. The executed instructions may cause the apparatus to implement the functions described in the embodiments.

The apparatus 500 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the functionality of the customer experience event generator described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The customer experience event generator operations illustrate a procedure that may be implemented in one or more physical or logical entities.

The present invention is applicable to any server, corresponding component, and/or to any communication system or any combination of different communication systems that support collecting data for customer experience events and receiving customer experience events. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

Apparatuses, such as servers, computers or corresponding server components, and/or other corresponding devices or apparatuses implementing the functionality of a corresponding apparatus described with an embodiment comprise not only prior art means, but also means for receiving data from a plurality of source systems in a communications network, said source systems encoding data according to different data models, defining rules of processing the data received from each of the source systems, generating, on the basis of the rules, at least one customer experience event of the communications network, determining the generated customer experience event to exceed a threshold that indicates a degraded service for a subscriber, determining a network element originating the generated customer experience event; and controlling, the determined network element or a controller of the determined network element.

More precisely, they comprise means for implementing functionality of a corresponding apparatus described with an embodiment and they may comprise separate means for each separate function, or means may be configured to perform two or more functions. Present apparatuses comprise processors and memory that can be utilized in an embodiment. For example, the customer experience event generator or a receiving system of customer experience events may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   receiving data from a plurality of source systems in a communications network, said source systems encoding data according to different data models,
   wherein the source systems are sub-systems of the communications network and provide subscribers of the communications network their subscribed services, said source systems comprising one or more of a billing system, a network management system of a telecommunications network, and a customer relationship management system;
defining rules of processing the data received from each of the source systems;
generating, in a distributed manner, independently and without customer involvement, on the basis of the rules, at least one customer experience event of the communications network;
determining, before the received data shows that the customer experience has been affected, the generated customer experience event to exceed a threshold that indicates a future degraded service for a subscriber;
determining a network element originating the generated customer experience event; and
controlling the determined network element or a controller of the determined network element.

2. The method according to claim 1, wherein the rules comprise aggregating the received data into the customer experience event.

3. The method according to claim 1, wherein the received data defines events, for example performance information such as call drops, of the source systems.

4. The method according to claim 1, wherein the controlling of the network element comprises rebooting the network element.

5. The method according to claim 1, comprising:
determining a customer experience event exceeding a threshold that indicates a network utilization of a service for a subscriber;
determining a network element originating the customer experience event; and changing one or more parameters of the service.

6. The method according to claim 1, comprising:
determining a customer experience event indicating an incorrect device setting of user equipment; and
sending a command to a device management server to supply the user equipment with new device settings.

7. The method according to claim 1, wherein the received data from a source system comprises performance data of the source system, for example performance data of an element of the source system, and the performance data is processed to a customer experience event.

8. The method according to claim 1, wherein the customer experience event comprises a header identifying the event and specifying one or more of a priority of the event, classification of the event, severity of the event, status of the event, application causing the event, hostname originating the event, time of the event, event type, correlation identifier of the event.

9. The method according to claim 1, wherein the customer experience event comprises a body comprising one or more attributes that include one or more from a group comprising: source system performance value, source system event name and source system event time.

10. The method according to claim 1, wherein source data is received from events, for example equipment faults, of the source system.

11. The method according to claim 1, wherein the customer experience event comprises an extended mark-up language, XML, file.

12. The method according to claim 1, wherein the customer experience event includes attributes from a defined set of attributes.

13. The method according to claim 1, wherein the customer experience event includes attributes from a defined set of attributes in a bulk format, for example as a file location storing the attributes.

14. The method according to claim 1, wherein customer experience event comprises one or more of a call drop, sleeping cell detection and a change in a quality of service, for example a change in delay or data rate.

15. The method according to claim 1, wherein the communications network comprises a mobile communications network.

16. An apparatus, comprising:
a receiver configured to receive data from a plurality of source systems in a communications network, said source systems configured to encode data according to different data models,
wherein the source systems are subsystems of the communications network and provide subscribers of the communications network their subscribed services, said source systems comprising one or more of a billing system, a network management system of a telecommunications network, and a customer relationship management system;
a storage medium configured to store rules of processing received data from each of the source systems; and
a controller configured to
generate, in a distributed manner, independently and without customer involvement, on the basis of the rules, at least one customer experience event of the communications network;
determine, before the received data shows that the customer experience has been affected, the generated customer experience event to exceed a threshold that indicates a future degraded service for a subscriber;
determine a network element originating the generated customer experience event; and
control the determined network element or a controller of the determined network element.

17. A computer program product embodied on a non-transitory computer-readable medium, said product including computer-readable code including rules of processing data received data from a plurality of source systems in a communications network, said source systems encoding data according to different data models,
wherein the source systems are sub-systems of the communications network and provide subscribers of the communications network their subscribed services, said source systems comprising one or more of a billing system, a network management system of a telecommunications network, and a customer relationship management system;
and a definition of a customer experience event generated, in a distributed manner, independently and without customer involvement, on the basis of the received data processed according to the rules.

* * * * *